(12) United States Patent
Rosenfelt et al.

(10) Patent No.: US 7,623,848 B2
(45) Date of Patent: Nov. 24, 2009

(54) METHOD AND SYSTEM FOR PROVIDING BACKUP MESSAGES TO WIRELESS DEVICES DURING OUTAGES

(75) Inventors: Michael I. Rosenfelt, Austin, TX (US); Satin Mirchandani, Austin, TX (US)

(73) Assignee: Dell Marketing USA L.P., Round Rock, TX (US)

( * ) Notice: Subject to any disclaimer, the term of this patent is extended or adjusted under 35 U.S.C. 154(b) by 587 days.

(21) Appl. No.: 10/805,907

(22) Filed: Mar. 22, 2004

(65) Prior Publication Data
US 2005/0003807 A1 Jan. 6, 2005

Related U.S. Application Data

(60) Provisional application No. 60/456,341, filed on Mar. 20, 2003.

(51) Int. Cl.
*H04M 1/725* (2006.01)
(52) U.S. Cl. ............... 455/412.1; 455/414.4; 714/4; 709/206; 709/203; 709/207
(58) Field of Classification Search ............ 709/206, 709/248, 203, 207; 455/412.1, 421.1, 414.4, 455/412.2; 714/4
See application file for complete search history.

(56) References Cited

U.S. PATENT DOCUMENTS

| | | | |
|---|---|---|---|
| 5,005,122 A | 4/1991 | Griffin et al. | |
| 5,608,865 A | 3/1997 | Midgely et al. | |
| 5,644,698 A | 7/1997 | Cannon | |
| 5,696,895 A | 12/1997 | Hemphill et al. | |
| 5,884,328 A * | 3/1999 | Mosher, Jr. | 707/202 |
| 5,920,848 A | 7/1999 | Schutzer et al. | |
| 6,115,743 A | 9/2000 | Cowan et al. | |
| 6,154,787 A | 11/2000 | Urevig et al. | |
| 6,202,169 B1 | 3/2001 | Razzaghe-Ashrafi et al. | |
| 6,292,905 B1 | 9/2001 | Wallach et al. | |
| 6,347,322 B1 * | 2/2002 | Bogantz et al. | 707/202 |
| 6,363,497 B1 | 3/2002 | Chrabaszcz | |
| 6,378,129 B1 | 4/2002 | Zetts | |
| 6,557,036 B1 * | 4/2003 | Kavacheri et al. | 709/224 |
| 6,578,041 B1 | 6/2003 | Lomet | |
| 6,587,959 B1 * | 7/2003 | Sjolander et al. | 714/4 |
| 6,587,970 B1 | 7/2003 | Wang et al. | |
| 6,651,077 B1 | 11/2003 | East et al. | |
| 6,671,724 B1 | 12/2003 | Pandya et al. | |

(Continued)

FOREIGN PATENT DOCUMENTS

WO     WO-01/30130     5/2001

(Continued)

*Primary Examiner*—Justin Y Lee
(74) *Attorney, Agent, or Firm*—DuBois, Bryant & Campbell, LLP; William D. Wiese (57) ABSTRACT

The method and system of the present invention provides an improved technique for providing email to a wireless device during an outage. Email messages are redirected from the primary email system to a secondary email system during an outage such as, for example, a natural disaster. Email messages are accessible from the secondary email system through a wireless device. A notification message is sent to the user's wireless device alerting them that their email messages are available on the secondary email system through their wireless device. After the termination of the outage, email messages received during the outage are synchronized into the users standard email application.

25 Claims, 7 Drawing Sheets

U.S. PATENT DOCUMENTS

| | | | |
|---|---|---|---|
| 6,820,214 B1 | 11/2004 | Cabrera et al. | |
| 6,851,073 B1 | 2/2005 | Cabrera et al. | |
| 6,857,009 B1 * | 2/2005 | Ferreria et al. | 709/219 |
| 6,886,030 B1 * | 4/2005 | Easterbrook et al. | 709/206 |
| 6,920,579 B1 | 7/2005 | Cramer et al. | |
| 6,948,104 B2 | 9/2005 | Herley et al. | |
| 6,957,248 B2 * | 10/2005 | Quine et al. | 709/206 |
| 7,076,687 B2 | 7/2006 | Fujibayashi et al. | |
| 2002/0107958 A1 | 8/2002 | Faraldo | |
| 2002/0138612 A1 | 9/2002 | Sekizawa | |
| 2002/0194379 A1 * | 12/2002 | Bennett et al. | 709/246 |
| 2003/0050984 A1 * | 3/2003 | Pickup et al. | 709/206 |
| 2003/0157947 A1 | 8/2003 | Fiatal et al. | |
| 2003/0191969 A1 * | 10/2003 | Katsikas | 713/201 |
| 2003/0236880 A1 | 12/2003 | Srivastava et al. | |
| 2004/0019695 A1 * | 1/2004 | Fellenstein et al. | 709/239 |
| 2004/0054741 A1 * | 3/2004 | Weatherby et al. | 709/206 |
| 2004/0078601 A1 * | 4/2004 | Tengwall et al. | 713/201 |
| 2004/0153713 A1 * | 8/2004 | Aboel-Nil et al. | 714/4 |
| 2004/0158766 A1 | 8/2004 | Liccione et al. | |
| 2004/0235503 A1 * | 11/2004 | Koponen et al. | 455/466 |
| 2005/0009502 A1 * | 1/2005 | Little et al. | 455/411 |
| 2005/0102074 A1 * | 5/2005 | Kolls | 701/29 |
| 2005/0120229 A1 * | 6/2005 | Lahti | 713/188 |

FOREIGN PATENT DOCUMENTS

| | | |
|---|---|---|
| WO | WO-01/67261 | 9/2001 |

\* cited by examiner

METHOD AND SYSTEM FOR PROVIDING BACKUP MESSAGES TO WIRELESS DEVICES DURING OUTAGES

PRIORITY STATEMENT UNDER 35 U.S.C. § 119 & 37 C.F.R. § 1.78

This non-provisional application claims priority based upon prior U.S. Provisional Patent Application Ser. No. 60/456,341 filed Mar. 20, 2003 in the names of Michael I. Rosenfelt and Satin Mirchandani, entitled "Method and System for Providing Backup Messages to Wireless Handheld Devices During Unplanned Outages."

BACKGROUND OF THE INVENTION

1. Technical Field of the Invention

The present invention relates generally to a method and system for processing email on a wireless device at times when email service to such device is otherwise not available. More particularly, the present invention provides for backup service to a wireless device during an outage, notifies users that alternative access is available to said email, and restores messages received during the outage into the users' original email system to maintain the integrity and continuity of the email file.

2. Background of the Invention

Individuals and companies are increasingly relying on wireless devices for the seamless delivery of email. Such devices provide users with access to email in a mobile environment. However, most wireless devices are dependent for their operation on the underlying health of the company's corporate email system as well as the wireless hardware and software platforms, such as the Blackberry Enterprise Server (BES), Microsoft PocketPC, or others, necessary to synchronize the wireless capabilities together with the corporate email system. If either the company's corporate email system is out of service, or the hardware or software connections are out of service, the wireless device will be unable to receive email messages.

To provide users with continuous service in the event of an outage, a company may elect to replicate its entire email system, such as a Microsoft Exchange database, in a remote datacenter on hardware similar to that owned by the company. Because of the complexity of such system, such as Microsoft's Exchange architecture, replication strategies have focused on real-time database replication of disks at the byte level or, alternatively, on transferring offline database backups on a server-by-server basis.

Even in cases where a company implements complete replication of its databases, it would not be uncommon for there to be gaps in email continuity due to, for example, database corruption, the presence of viruses, denial of service attacks, security breaches and other factors. Some of the most often cited problems with replication are:

1. High Cost. The cost involved in replication can be staggering. In order to implement an effective replication system, the company must purchase third party replication software, acquire network bandwidth, secure server capacity, retain administrative support and then monitor each of these systems.
2. Replication of Only a Subset of the Servers. As a result of the costs inherent in providing a replicated database, such as, for example, the cost of hardware, software, bandwidth and support personnel, it is common for only a few of the most critical servers to be replicated.
3. Database Corruption. Because replication technology by its very nature mirrors the files from one server onto another, a corrupt file on the original server will be mirrored in its corrupt form on the backup server. There is currently no efficient means for preventing the mirroring of corrupt files.
4. Incapacitation Due to Virus. Similarly, if a virus occurs in a file on the original server, it will be transported to the second server. Server corruption due to viruses can cause email outages for days.
5. Transactional Inconsistency. Because replication solutions typically perform byte-level replication of the disks, they do not provide integrity for the Exchange transaction boundaries. For example, a single transaction on Microsoft Exchange may consist of ten sequential writes to the disk. If the replication software has only replicated eight of those ten at the time of an outage, then the backup will be incomplete, resulting in a corrupt file which may fail to mount.
6. No Vendor-Supported Replication Solution. Currently no system that replicates systems like the Microsoft Exchange database is readily available at an economical price.
7. Complexity of Replication. The complexity of making an efficient, effective replication solution causes the system to be more prone to failure and thereby require greater resources to maintain.

For all of these reasons the existing technology fails to provide an adequate method for processing email to a wireless device during an outage. There is a need, therefore, for an improved method and system for providing email messages to a wireless device during an outage.

SUMMARY OF THE INVENTION

The present invention relates generally to a method and system for providing email to a wireless device during an outage and substantially departs from the conventional concepts and designs of the prior art. More particularly, the present invention comprises the steps of managing users' email on said users' wireless device; redirecting email messages from a primary server to a secondary server when said primary server is unavailable; notifying said users that the redirection of email messages has been implemented; providing the users with access through their wireless device to the email addresses on a secondary server while the primary server is unavailable; notifying users when the primary server is again available; and incorporating the email messages received while the primary server was unavailable into the software for managing users' email so as to create a complete email history.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the presently preferred exemplary embodiments. However, it should be understood that these embodiments provide only a few examples of the many available embodiments and advantageous uses of the innovative teachings described herein. In general, statements made in the specification of the present application do not necessarily delimit any of the various claimed inventions. Moreover, some statements may apply to some inventive features, but not to others.

Figure 1:
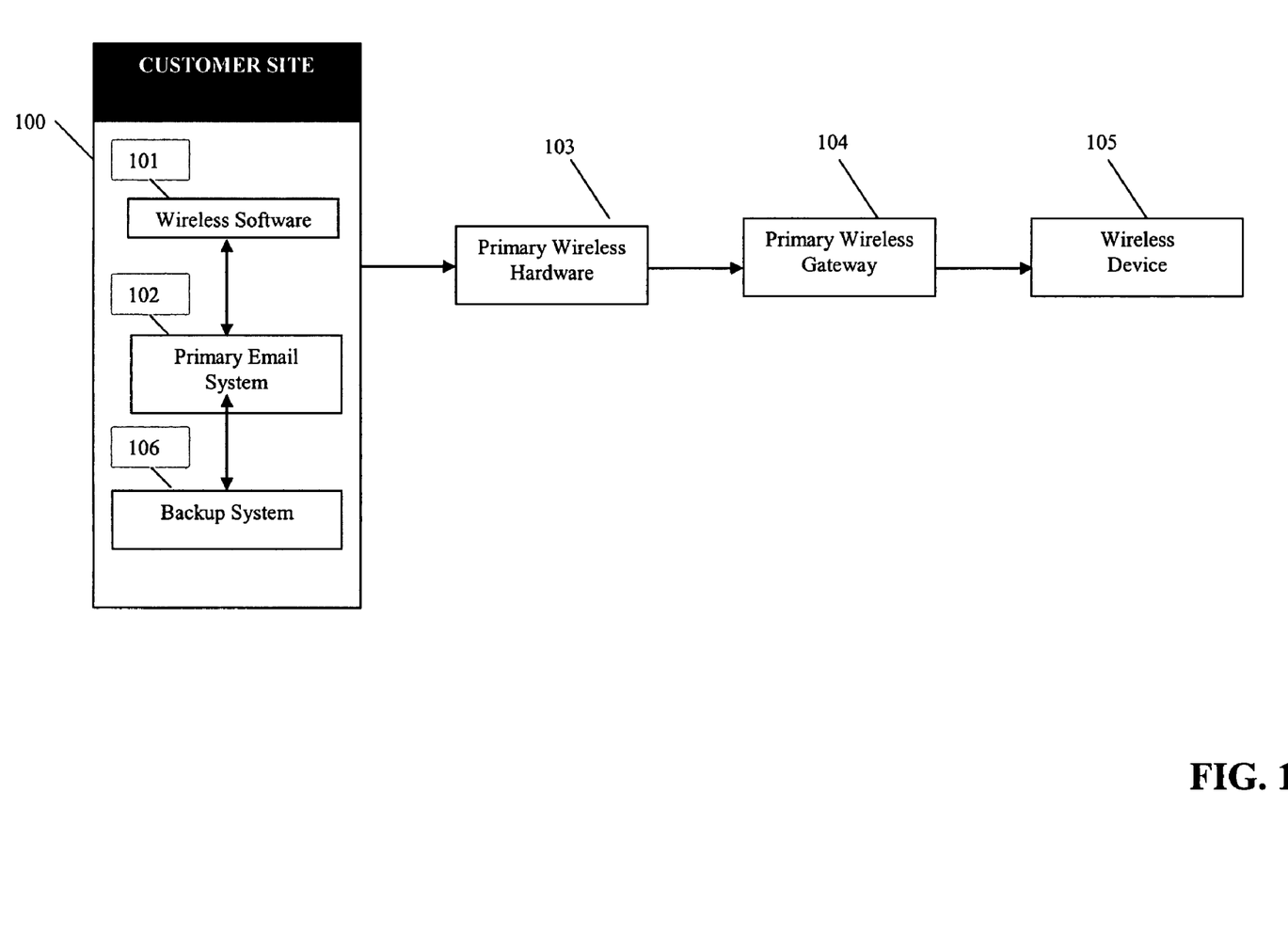
FIG. 1 is a diagram of a typical prior art wireless handheld system.

FIG. 1 is a diagram of a typical operating environment for a wireless device. The customer operates its legacy email system 102 within the confines of its company site 100. In connection with the legacy email system, the company will also use wireless software 101 such as, for example the Blackberry Enterprise Server (BES) software, PocketPC software or others. Email messages are received and processed through the company's email system 102 using the wireless software 101. When email messages are intended to be directed to a wireless device 105, they are sent through wireless hardware 103 to a wireless gateway 104 for delivery to the wireless device 105. The wireless hardware 103 could be, for example, any infrastructure set up for the delivery of messages through a wireless gateway. The wireless gateway 104 could be, for example, a gateway such as that commonly available through GoAmerica, Cingular, or others. The wireless device could be, for example, a personal data assistant (PDA), such as a Blackberry device, a cellular phone, a pager or other device capable of wirelessly receiving email messages.

Some companies may elect to implement a backup system 106 for purposes of creating a replicated email system. In such cases, email messages are initially directed to, received by and processed on the email system 102. The information from the email system 102 is replicated on the backup system 106. The replication process can occur at the byte level, the file level or the disk level. In some cases, the replication system is configured such that only files or disks to which changes have been made are replicated. In the event of an outage of the primary email system 102, the backup system 106 is activated. However, because the email system 102 and the backup system 106 do not act in concert, it is necessary to take the email system 102 completely off line before activating the backup system 106. Moreover, it is not possible to test the efficacy of the replication system by transferring only a few users from the email system 102 to the backup system 106. Also, because of the complexities in transferring from the email system 102 to the backup system 106, it can take as long as 30 to 60 minutes to complete a transfer at the time of the outage. Moreover, the backup email system 106 is fully integrated with the wireless software 101 and the wireless hardware 103, the backup system 106 will not have the functionality required to deliver email messages to the wireless device 105.

Figure 2:
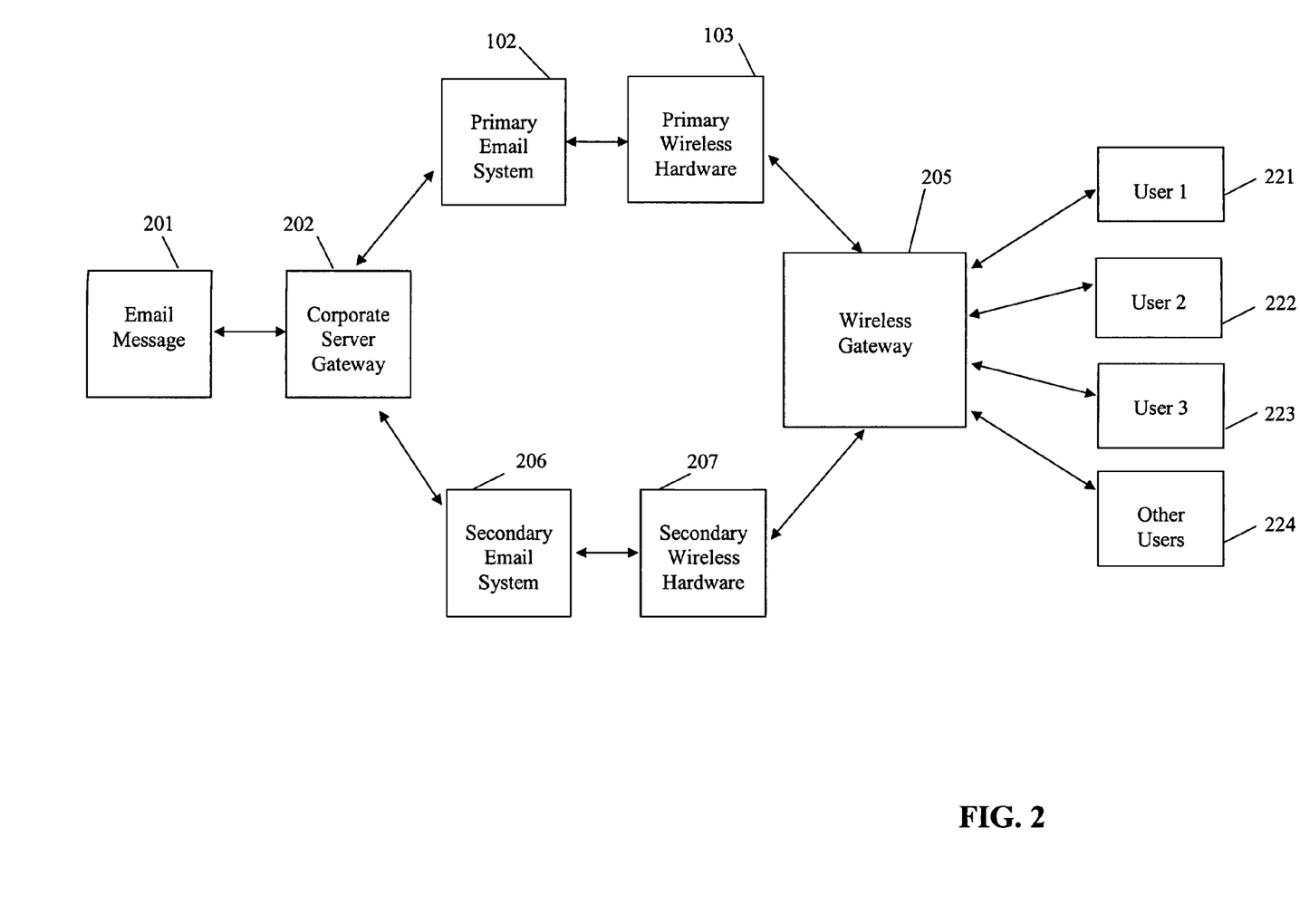
FIG. 2 is a diagram showing the preferred method of the present invention for providing email to a wireless device during an outage.

FIG. 2 shows a diagram outlining the preferred method for processing email during an outage. In normal operating environment, email messages 201 are directed to a corporate server gateway 202. If there are no outages or other reasons why the primary email system 102 may be down, email messages 201 are directed to the primary email system 102. From there, email messages 201 directed to the primary wireless hardware 103 for processing through the wireless gateway 205 and on to the respective users.

In those cases where there is an outage or the primary email system 102 is otherwise unavailable, email messages 201 are redirected from the primary email system 102 to a secondary email system 206. Users are notified that email messages 201 have been redirected and those users are provided access to their email messages 201 through the secondary email system 206. Users are again notified when the primary email system 102 is available. Once email messages 201 are received at the secondary email system 206, they are passed through the secondary wireless hardware 207 to the wireless gateway 205 and on to the users. It is important to note that the primary wireless hardware 103 may be, but need not be, distinct from secondary wireless hardware 207. However, it may be beneficial to have primary wireless hardware 103 separate from secondary wireless hardware 207 in cases where primary wireless hardware 103 is physically located adjacent to primary email system 102.

In an exemplary embodiment of the invention, email messages 201 are sent to a server gateway 202. In a corporate environment, email messages may be sent from customers, vendors, partners, suppliers and the like. In a typical environment, email messages are routed to an email application residing on the primary email system 102. The registry of all email addresses residing on the primary email system 102 is kept either on the primary server used in connection with the primary email system 102 or on the corporate server gateway 202. In some cases, the method of determining the email addresses that reside on the primary email system 102 utilizes functionality inherit within the email application. In other cases, the method of determining the email addresses that reside on the primary email system 102 may be an independent program operating autonomously.

Next, email addresses that are redundant to the email addresses residing on the primary email system 102 are created on the secondary email system 206. The secondary email system 206 can be located remotely from the corporate server gateway 202 and may be connected, for example, through the Internet. In most cases, a message will be employed whereby the email addresses on the secondary email system 206 will be updated on a periodic basis to replicate the email addresses on the primary email system 102. This creation of redundant email addresses on the secondary email system 206 is continued on an ongoing basis.

A method is next employed to detect whether email addresses that reside on the primary email system 102 are detectable to email messages 201. In some cases, this detection can be as simple as monitoring the email flow for error messages indicating a delivery failure. In other cases, an automated method may be employed which continually monitors a flow of messages 201 to determine whether they are received by the primary email system 102 as intended.

As such time as the email addresses that reside on the primary email system 102 not detectable to email messages 201, the email messages 201 are redirected from the primary email system 102 to the secondary email system 206. The transition from the primary email system 102 to the secondary email system 206 occurs once it has been determined that the email addresses on the primary email system 102 are not being detected by email messages 201. It is also possible to direct only a portion of the email messages 201 from the primary email system 102 to a secondary email system 206 in cases where only a portion of the email addresses residing on the primary email system 102 are undetectable to email messages 201. Similarly, a decision may be made to transfer all email messages from the primary email system 102 to the secondary email system 206 even though only a portion of the email addresses on the primary email system 102 are undetectable to email messages 201. In this may be useful, for example, in those cases where it appears that the primary email system 102 may be prone to additional failure. It may also be desirable in those cases where the transition from the primary email system 102 to the secondary email system 206 is performed manually, to implement a password protection scheme whereby ability to effectuate the transition requires the entering of a password.

At the time, or immediately after, email messages 201 have been redirected to the secondary email system 206, a notification is sent to users alerting them that email messages on the secondary email system 206. The notification method may consist, for example, the automated delivery of notification messages through an alternate email address for each of the users. Alternatively, an automated message may be sent to each of the users whereby the users receive the message on their wireless device. The notification messages can also be sent to, for example, cellular telephones, pagers and the like. Each of the users will then have access to the secondary email system 206 through their wireless device.

During the period that email messages 201 are directed to the secondary email system 206, continual assessment may be conducted to determine whether email addresses, residing on the primary email system 102, are again detectable to email messages 201. This activity may take the form of, for example, periodically pinging the email addresses residing on the primary email system 102 and evaluating whether a response is received.

Once the primary email system 102 is again available, email messages 201 that had been directed to the secondary email system 206 can be redirected back to the primary email system 102. At that time, users can be notified that the primary email system 102 is again operational and that their primary email system 102 is functioning. The notification to users can again be in the form of a notification message delivered to each user's wireless device.

Once email messages 201 are successfully redirected to the primary email system 102, email messages 201 that had been received on the secondary email system 206 during the outage can be synchronized in the user's primary email application thereby creating a comprehensive email history within that application. It is important to understand that in the preferred embodiment there is no need to take the primary email system 102 completely offline in order to test the efficacy of the secondary email system 206. In addition, there is no significant cost inherent in testing the efficacy or functionality of the secondary email system 206. In addition, the ability to transfer only a portion of the email addresses residing on the primary email system 102 to the secondary email system 206 provides a tremendous benefit. For example, if only a limited number of email addresses residing on the primary email system 102 are affected, then only the email messages 201 intended for those email addresses can be redirected to the secondary email system 206. In another example, after an outage has occurred, it is possible to redirect the email messages 201 back to the primary email system 102 on a limited basis to test the viability of the primary email system 102 without the need to transfer all of the addresses on the secondary email system 206 to the primary email system 102. Also, redirecting email messages 201 from the primary email system 102 to the secondary email system 206 can be effectuated in less than 2 minutes compared to the 30 to 60 minutes required in traditional replication systems.

Figure 3:
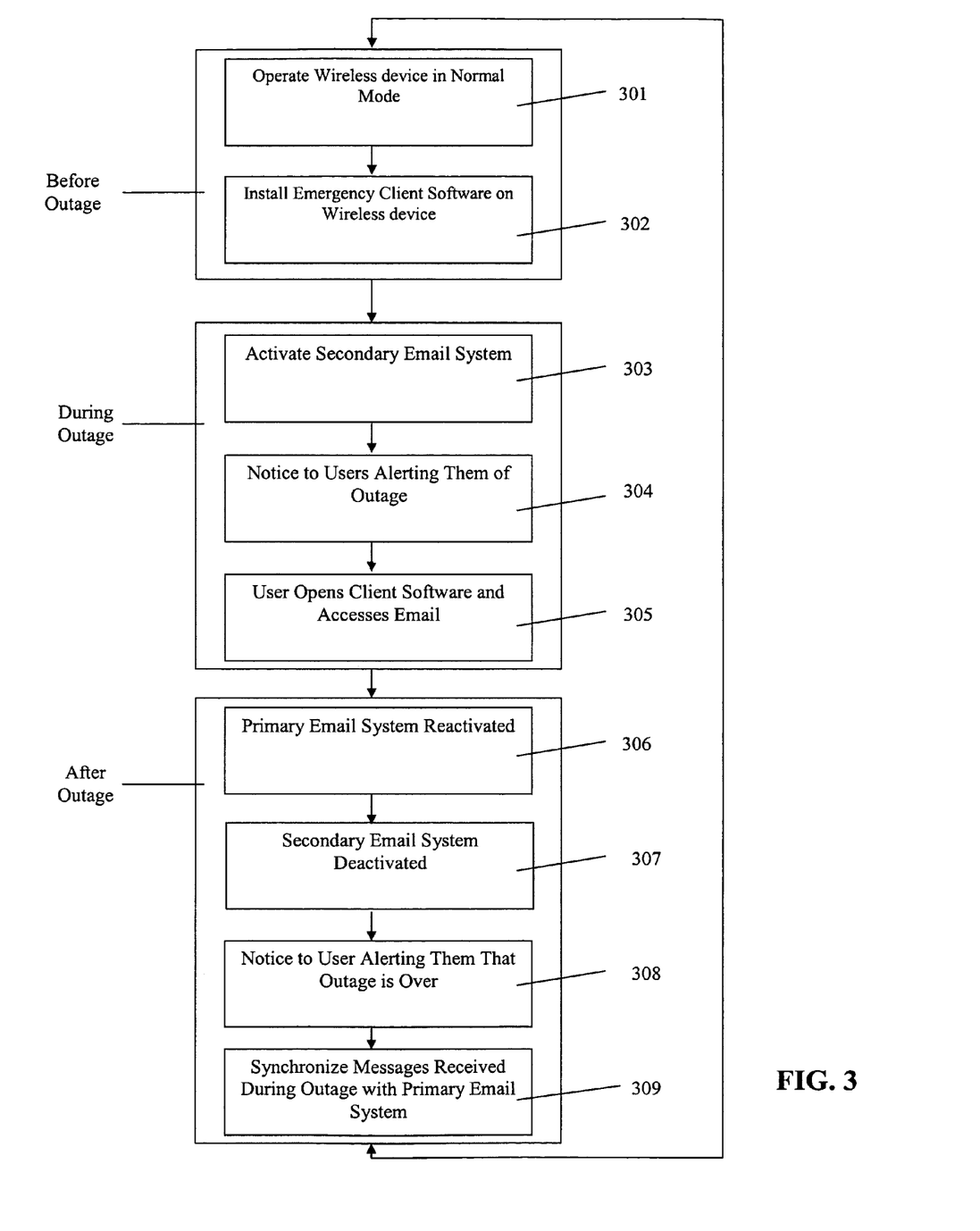
FIG. 3 is a flow diagram showing the activities occurring during an outage.

FIG. 3 is a flow diagram showing the activity occurring before an outage, during an outage and after an outage. Initially, the user will operate the wireless device in a normal mode 301. The user will be unaware that a redundant system is in place. Before an outage occurs, the user will install client software on the user's wireless device 302. The client software application will be similar in functionality to the normal inbox that occurs on the user's wireless device when they view email. The purpose for the client software is that it connects directly to the secondary email system 206 instead of to the company's primary email system 102. The client software remains unused and transparent to the user until the secondary email system 206 is activated.

During a full or partial outage, the secondary email system 206 is activated 303. A notice is sent to users alerting them of the outage 304. The user then opens the client software and accesses their email 305. The user will have the ability to send and receive email messages through their existing email address on their wireless device. In addition, the users will have access to their contacts and calendar through their wireless device.

After the outage has been terminated, the primary email system is reactivated 306 and the secondary email system is deactivated 307. A notice is sent to the user alerting them that the outage is over 308. Messages that were received into, and sent from, the secondary email system 206 are then synchronized with the primary email system 309. User then returns to operating the wireless device in its normal mode 301.

Figure 4:
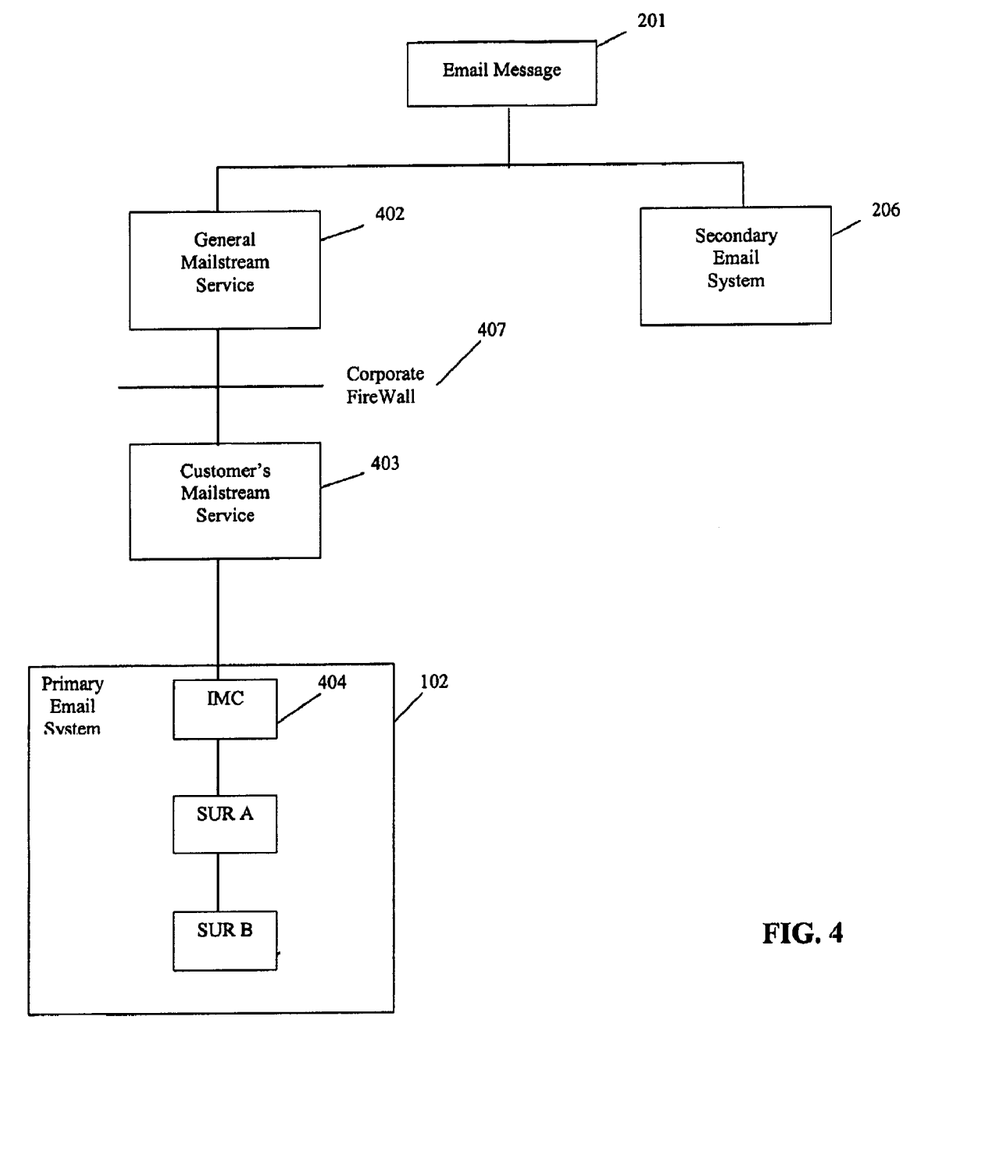
FIG. 4 is a flow diagram showing a method of intercepting messages sent to the corporate email system.

FIG. 4 is a diagram showing the locations within a mail stream in which a email message 201 could be intercepted and redirected to a secondary email system 206. For example, when an email message 401 is in transit through the general mail stream service 402, the email message 201 may be intercepted as part of an independent service offering. In such a circumstance, customers could list the simple mail transfer protocol (SMTP) address of this independent service contained within the email message 201. During normal operation, the SMTP address is transparent to the system and email is delivered to the primary email system 102 without interruption. In the event of an outage of the primary email system 102, the independent service intercepts messages containing the SMTP address and directs those messages to a wireless device. This independent service then receives the incoming mail stream through the email message 201, redirect messages as appropriate and forward the rest of the mail stream to the primary system. Upon an outage of the primary email system 102, email messages, such as email message 201, would continue to point the secondary email system 206 which would accept such messages and redirect them to the designated wireless device. By intercepting the email message 201 at this location, it is possible to provide protection against the failure of all customer hosted facilities such as, for example, the customer's mail system or gateway.

Another location where the email message 201 could be intercepted and redirected is at the customers' mail stream service 403. Functionality of the customer's mail stream service 403 would be similar to that described for the general mail stream service 402. However, the customer's mail stream service 403 would be located behind the corporate firewall 407. The customer's mail stream service 403 would provide that inbound SMTP messages would be redirected directly to wireless devices or to an offsite service which could then forward the messages to the appropriate wireless device. Redirecting the email message 201 through the customer's mail stream service 403 would provide protection against the failure of the primary email server or the wireless gateway, but could require additional hardware in order to host the customer's mail stream service application.

Yet another location for intercepting and redirecting an email message 201 is at the inbound internet mail connector (IMC) 404 in the primary email system 102. As will be understood by those skilled in the art, the IMC 404 is often on a separate server from the primary email system 102. Accordingly, upon an outage of the primary email system, it would still be possible to redirect email messages from the IMC 404.

Another location in which email messages could be redirected is within the primary mail system itself. For example, in the event of an outage causing portions of the primary email system 102 to be operational and other portions not to be operational, the message routing functionality of the primary email system would be modified on a real-time basis so as to redirect messages from mail boxes that are not operational within the primary email system 102 to the backup email system 206.

It should be noted that it may be necessary at times to redirect the email message 201 from the primary email system 102 to the secondary email system 206. At other times, it may be necessary to redirect the email message 201 from the secondary email system 206 to the primary email system 102. For example, in the case of an outage of the secondary email system an alternate or backup entry can be placed in the email message 201 instructing that the email message 201 be redirected from the secondary email system 206 to the primary email system 102.

Another method for redirecting an email message 201 within the present invention is to redirect an email message down an alternate path at the time the primary email system 102 is unavailable using, for example, an event sync within an email application such as Microsoft Exchange designed to inspect message traffic and alter or copy that message to another destination. Yet another method of redirecting email messages is to redirect all messages with a lower priority designation to a separate SMTP host during an outage of the primary email system 102. Yet another method of redirecting email message 201 is to change the domain name system (DNS) identifier of the primary email system 102 at the time of the outage of the primary email system 102 such that inbound email messages, such as email message 201, are redirected to an alternate facility.

Figure 5:
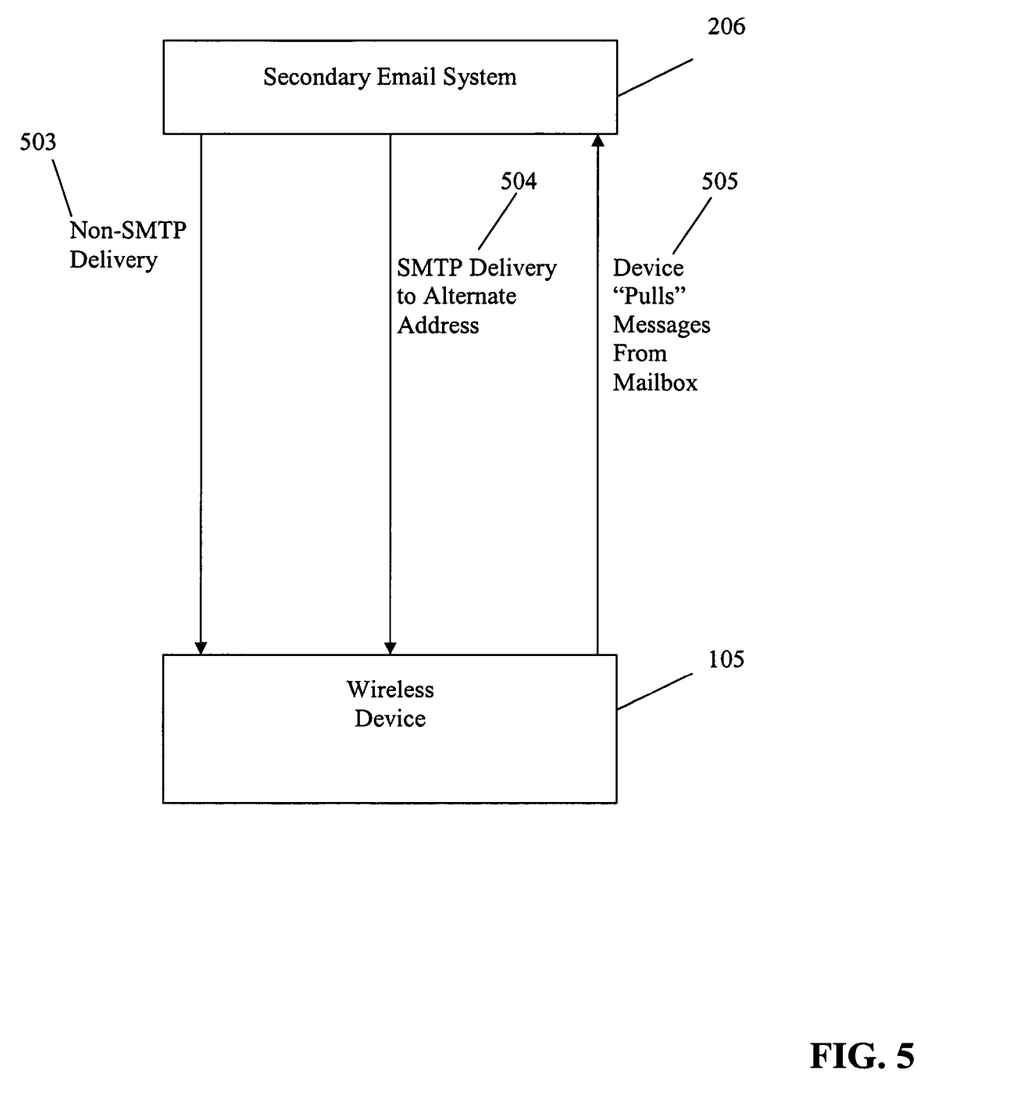
FIG. 5 is a flow diagram showing alternative methods for messages to reach a wireless device.

FIG. 5 is a diagram showing methods by which a secondary email system 206 can deliver messages to a wireless device 105. Once messages are routed to an alternate location, they can be delivered to wireless devices in a number of different ways. For example, the secondary email system 206 can forward messages to a wireless device 105 using non-SMTP delivery 503 such as short messaging service (SMS) or native device addressing. In particular, for devices capable of receiving more than one type of data feed, a mapping can be kept of an alternate method to deliver text messages to those devices. In the event of an outage of the primary email system, messages can be sent through this alternate protocol.

The secondary email system 206 can also forward messages to wireless device 105 through use of SMTP delivery to alternate email addresses 504. In this case, the alternate email addresses map to the wireless device 105. When the primary path to deliver the email message 201 to the wireless device 105 fails, the email message 201 can be forwarded to that device's alternate address.

As another alternative, the wireless device 105 can "pull" messages from the secondary email system 206 using protocols such as pop3 or imap4. The wireless device 105 would be instructed to pull messages in the event of an outage of the primary email system 102.

As another alternative, upon an outage of the primary email system 102, email message 201 can be routed to wireless device 105 using non-SMTP, device specific addressing.

Figure 6:
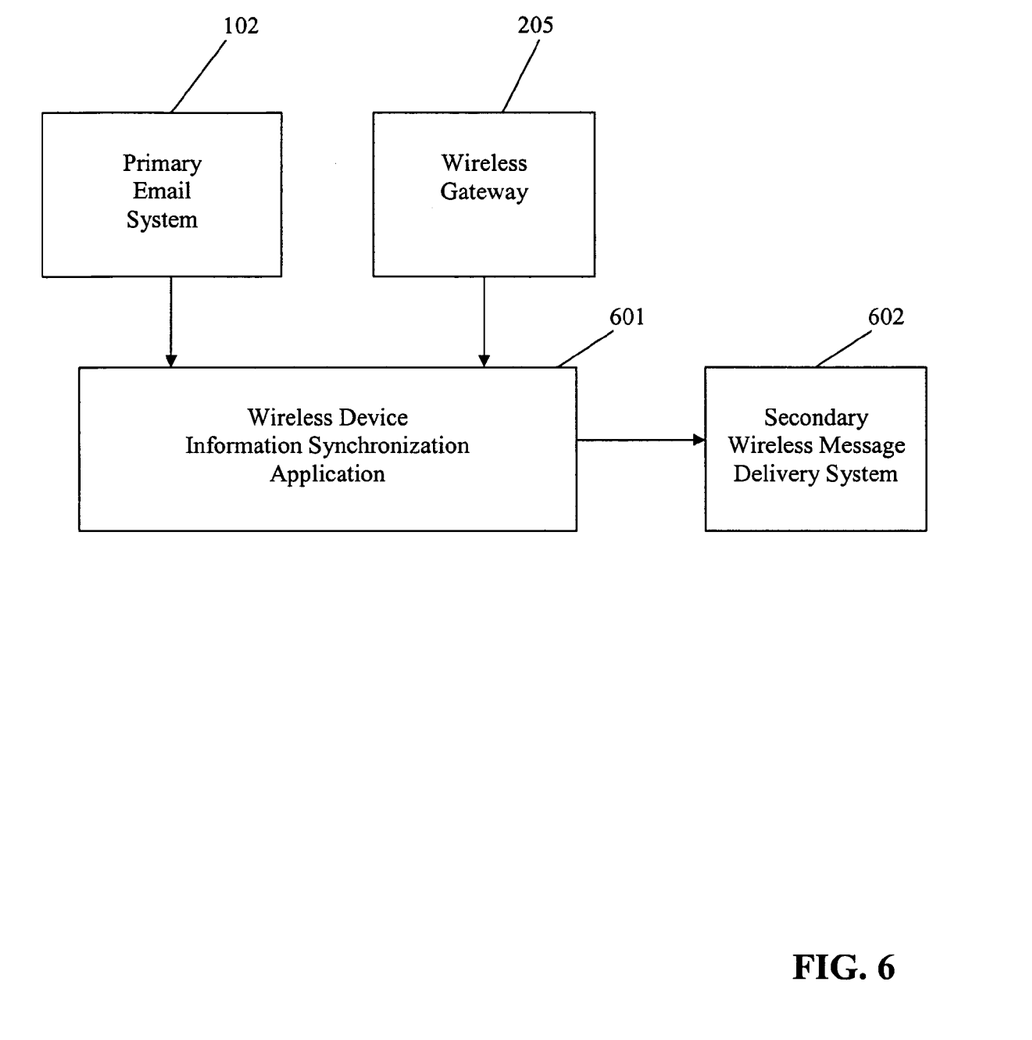
FIG. 6 is a flow diagram showing the preferred method of synchronizing information.

FIG. 6 is a diagram of a method for synchronizing information regarding wireless device users and other critical information. Regardless of the location of the secondary email system 206, having critical information from the primary email system 102, the wireless gateway 205, or both, is critical. This is accomplished through a wireless device information synchronization application 601 that synchronizes with the primary email system 102 and the wireless gateway 205 to extract information critical to the redirection of email messages at the time of an outage of the primary email system. Information to be synchronized includes, for example, a list of wireless device users, email addresses, device identification information, incription keys, preferences and wireless platform. This information is sent to the secondary wireless message delivery system 602 that receives the inbound SMTP stream during an outage of the primary email system and that performs the redirection with the assistance of the information provided.

Figure 7:
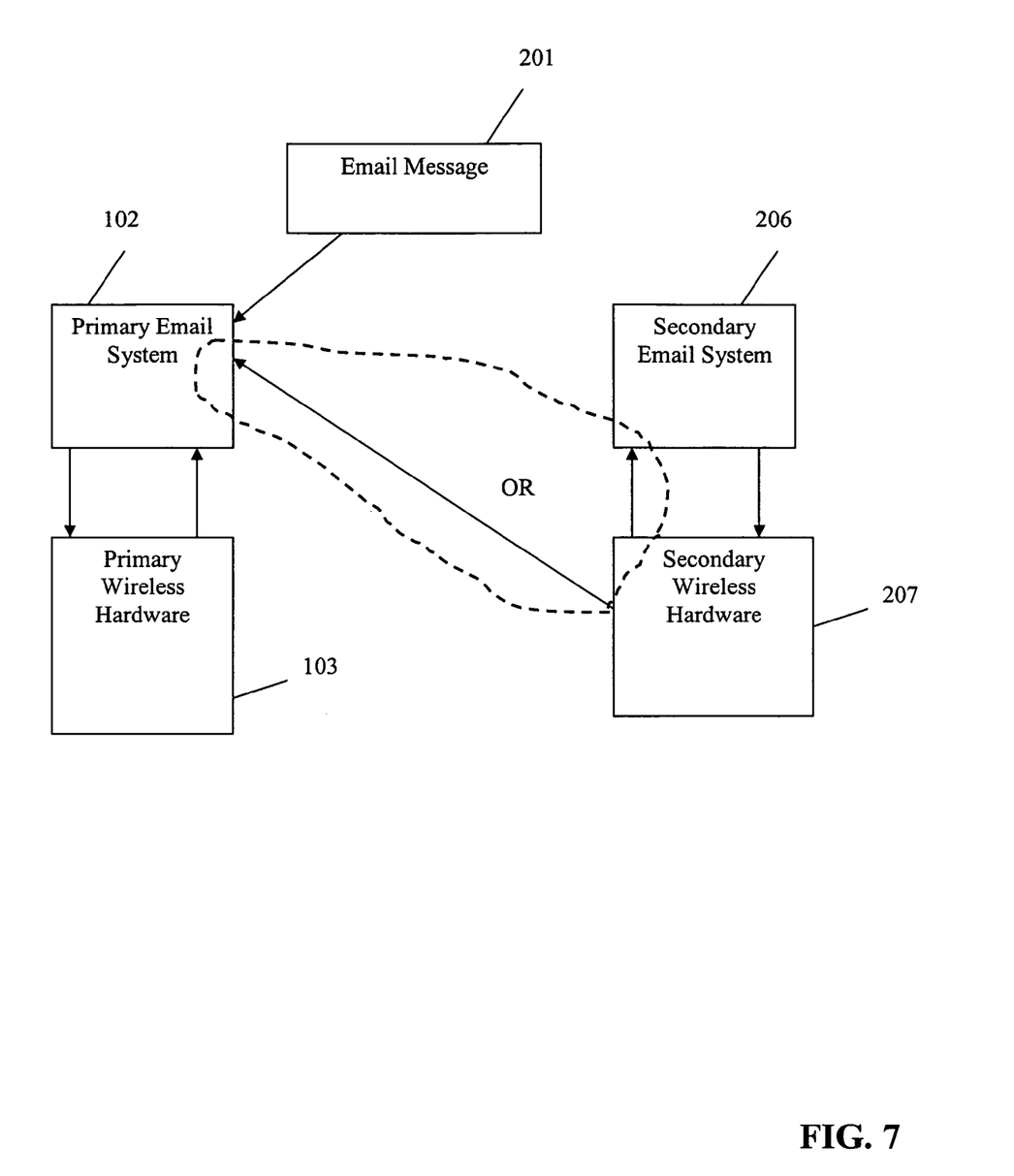
FIG. 7 is a flow diagram showing an alternative method for providing email messages to wireless devices.

FIG. 7 is a diagram showing the method for routing email to wireless devices by redirecting to an alternate infrastructure. Through this methodology, the secondary email system 206 and secondary wireless hardware 207 are located in a separate location from the primary email system 102 and the primary wireless hardware 103. Upon a failure of the primary wireless hardware 103, the primary wireless hardware 103 would be disconnected from the wireless network and a new session initiated by the secondary wireless hardware 207. The secondary wireless hardware 207 is configured to connect to the primary email system 102 if it is still operational.

We claim:

1. A method for providing backup electronic messaging services to wireless devices during outages, comprising:

sending email messages from a primary email system to a user's wireless device;

when said primary email system is unavailable, redirecting said email messages from said primary email system to a secondary email system and from said secondary email system to said user's wireless device;

notifying said user that said email messages are available on said user's wireless device through said secondary email system at a time when said redirection of said email messages has been implemented;

at a time when said primary email service becomes available, redirecting said email messages from said secondary email system to said primary email system and from said primary email system to said user's wireless device;

notifying said user that said email messages are available on said user's wireless device through said primary email system at a time when said redirection of said email messages has been implemented; and synchronizing said email messages received on said secondary email system while said primary email system was unavailable with the messages in said primary email system.

2. The method of claim 1, wherein said primary email system is located remotely from said secondary email system and is interconnected to said secondary email system through the Internet.

3. The method of claim 1, wherein a determination of when said primary email system is unavailable is performed manually by assessing whether an error message has been received indicating an inability to deliver an email message to said primary email system.

4. The method of claim 1, wherein said email messages to all addresses on said primary email system are automatically redirected to said secondary email system at any time any of said email addresses on said primary email system are unavailable.

5. The method of claim 1, wherein said email messages to all email addresses on said primary email system are redirected to said secondary email system after some, but less than all, of said email messages are unavailable.

6. The method of claim 1, wherein said step of notifying said user that said email messages are available on said secondary email system further includes the automated delivery of a preexisting notification email message to an alternate email address for said users.

7. The method of claim 1, wherein assessing the time at which said primary email system is available includes periodically pinging email addresses on said primary email system and evaluating whether a response is received from said email addresses.

8. The method of claim 1, wherein said notification of said user that said email messages are again available on said primary email system consists of the automated delivery of a preexisting notification email message to an alternate email address for said user.

9. The method of claim 1, wherein the ability to redirect said email messages from said primary email system to said secondary email system is password protected.

10. The method of claim 1, wherein one or more of said wireless devices is selected from the group consisting of personal digital assistant devices, cell phones and pagers.

11. A method for intercepting and redirecting email messages to wireless devices, comprising:
changing a domain name system designation of a primary email system responsive to detection of an outage of the primary email system;
directing inbound email messages to an alternate facility; and
delivering said email messages from said alternate facility to said wireless devices; and
notifying an intended recipient of said email messages that said messages are available on said recipient's wireless device through said alternate facility at such time as said redirection of said email messages has been implemented.

12. A method for delivering backup messages to wireless devices, comprising:
maintaining a mapping of alternate email addresses of the wireless devices;
delivering, via said alternate email address, the email messages to said wireless device responsive to detection of an outage of a primary email system;
wherein said step of delivering is performed during said outage of a primary path for delivering said email messages; and
notifying an intended recipient of said email messages that said messages are available on said recipient's wireless device through said alternate facility at such time as said redirection of said email messages has been implemented.

13. The method according to claim 12, further comprising:
pulling messages from a mailbox within a secondary email system to the wireless device.

14. The method of claim 13 wherein said mailbox is a pop3 mailbox.

15. The method of claim 13 wherein said mailbox is an imap4 mailbox.

16. A system for providing backup electronic messaging services to wireless devices during outages, comprising:
a primary email system, wherein said primary email system is configured for delivering email messages to said wireless devices;
a secondary email system, wherein said secondary email system is configured for delivering said email messages to said wireless devices at a time when said primary email system is unavailable;
at a time when said primary email system becomes unavailable, users of said wireless devices are notified that said primary email system is unavailable; and
at a time when said primary email service again becomes available, redirecting said email messages from said secondary email system back to said primary email system for delivery to said wireless devices, notifying said users that said email messages are available on said users wireless device through said primary email system, and synchronizing said email-messages received on said secondary email system—while said primary email-system was unavailable with the messages in said primary email system.

17. The system of claim 16, wherein said primary email system is located remotely from said secondary email system and is interconnected to said secondary email system through the Internet.

18. The system of claim 16, wherein said system is adapted to manually detect when said primary email system is unavailable by assessing whether an error message has been received indicating an inability to deliver said email messages to said primary email system.

19. The system of claim 16, wherein said email messages to all addresses on said primary email system are automatically redirected to said secondary email system at any time any of said email addresses on said primary email system are unavailable.

20. The system of claim 16, wherein said email messages to all email addresses on said primary email system are redirected to said secondary email system after some, but less than all, of said email messages are unavailable.

21. The system of claim 16, wherein said notification to said user that said email messages are available on said secondary email system further includes an automated delivery of a preexisting notification email message to an alternate email address for said users.

22. The system of claim 16, wherein assessing a time at which said primary email system is available includes periodically pinging an email addresses on said primary email system and evaluating whether a response is received from said email addresses.

23. The system of claim 16, wherein notifying said user that said email messages are again available on said primary email system consists of the automated delivery of a preexisting notification email message to an alternate email address for said user.

24. The system of claim 16, wherein an ability to redirect said email messages from said primary email system to said secondary email system is password protected.

25. The system of claim 16, wherein one or more-of said wireless devices is selected from the group consisting of personal digital assistant devices, cell phones and pagers.

* * * * *